June 18, 1968 J. E. GORGENS ET AL 3,388,600
GAUGE CONSTRUCTION
Filed Feb. 26, 1965
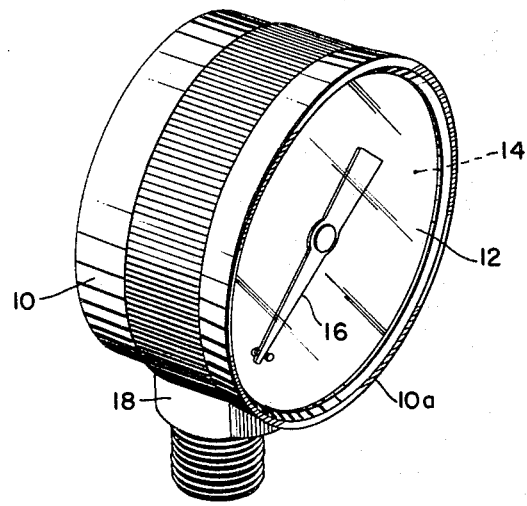
FIG. 1
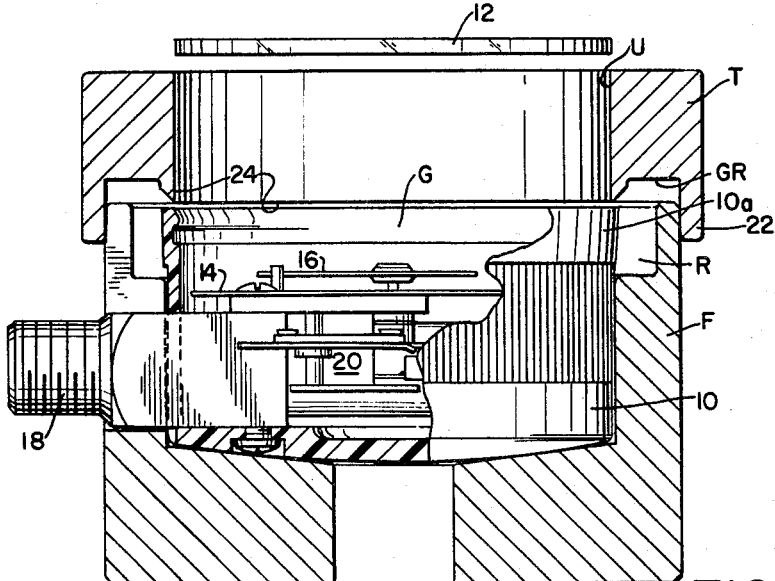
FIG. 2
FIG. 3
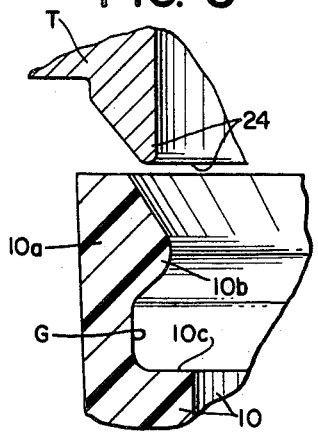
FIG. 4
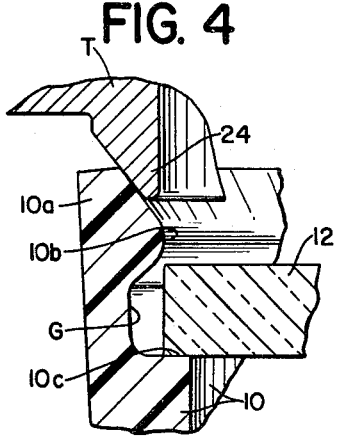
FIG. 5
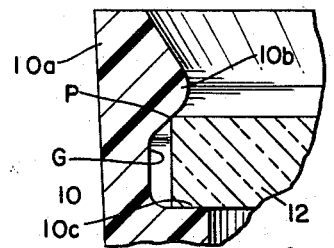
INVENTORS
JOSEPH E. GORGENS
MICHAEL JANKURA
*Darby + Darby*
ATTORNEYS United States Patent Office 3,388,600
Patented June 18, 1968

3,388,600
GAUGE CONSTRUCTION
Joseph E. Gorgens and Michael Jankura, Stratford, Conn., assignors to Dresser Industries, Inc., Stratford, Conn., a corporation of Delaware
Filed Feb. 26, 1965, Ser. No. 435,575
7 Claims. (Cl. 73—431)

ABSTRACT OF THE DISCLOSURE

An instrument housing formed of an integral cup-shaped case of resilient material containing a front mounted crystal secured sealed in position by the resilient compression of the casing against the periphery of the crystal.

This invention relates to a gauge construction, with special reference to a gauge casing and a light transmitting closure therefor, comprising in conjunction a complete housing enclosure for any type of gauge, such as, for example, pressure fluid gauges, temperature gauges and the like.

A further object of the invention is to provide a novel method of effecting the placement of the transparent closure into the gauge casing, in order to provide a substantially fluid tight connection or seal therebetween.

The details comprising the novel subject matter herein disclosed and the objects and advantages of the invention will be best understood after a detailed description of the structure involved and the method of assembly of the two parts comprising the structure.

A specific embodiment of the invention is illustrated in the accompanying drawings, in which:

FIGURE 1 is a perspective view of the gauge casing of this invention forming a part, in this instance, of a pressure fluid gauge;

FIGURE 2 is a vertical central cross-sectional view through the structure of FIGURE 1, with some parts in elevation showing the gauge casing and its contents positioned in a special fixture, by means of which the transparent gauge cover or closure is positioned in the gauge casing;

FIGURES 3, 4 and 5 are enlarged detailed cross sectional views illustrating the manner in which the gauge casing is deformed to receive the cover and then lock it in a final position.

The gauge casing 10, in the form illustrated, is a cylindrical cross section and is cup-shaped, having a back wall integral with a peripheral wall to form an open-sided cup, namely the casing 10. In accordance with the objects of this invention, this casing is made of a stretchable, resilient material for purposes to be hereinafter explained. Thus, it may be made of many available plastic materials capable of being molded to the desired shape and dimensions. One suitable example of a plastic that can be used is polypropylene, but those skilled in the art of molding items of this type are fully aware of many other materials suited to this purpose.

As a further indication to those skilled in the art of the desired characteristics of the casing in accordance with this invention, it is noted that since the gauge contents are in generally exposed relation to the casing any plastic can be used which is sufficiently soft so as to provide shock resistance for the gauge contents and closure or cover disk which, in many instances, is made of glass. The plastic used should be stretchable, so as to permit the filling of the glass into place and the attainment of a fluid tight seal between the case and the glass. It should be corrosion resistant and preferably should be capable of injection molding.

The casing 10 is closed by a transparent glass or plastic disk 12 positioned to overlie a dial plate 14 over which a pointer 16 moves. This pointer is driven by any suitable operating mechanism, indicated generally at 20, since, per se, it is of no importance to the subject matter of this invention. Since a fluid pressure gauge is illustrated, a fitting 18 projects from the casing 10 for supplying fluid pressure to be measured to the operating mechanism.

As illustrated in FIGURE 3, the casing 10 is provided with a relatively thin peripheral terminal wall 10a having a radially inwardly projecting formation 10b. A seat for the closure disk 12 is formed by the shoulder 10c, which is overhung, so to speak, by the annular rib or radial projection 10b. The rib 10b and shoulder 10c form an annular groove or channel G.

In order to position the crystal in the casing the assembled gauge, lacking the crystal, is seated in a cup-shaped fixture F. The lower portion of the casing has a relatively snug fit with the recess of the cup. The upper wall of the cup is reduced in thickness to form an annular space R between it and the wall portion 10a of the casing 10. An expanding tool T has a central passage U therethrough, to permit the crystal 12 to fall therethrough by gravity. The result is a ring-shaped member, which has a groove GR cut in the end face thereof to form an annular lip 22, whose internal diameter forms a sliding fit with the outer wall of the fixture F, as shown in FIGURE 2. The groove GR is also shaped to form an annular lip 24 having an inclined face, see particularly FIGURES 3 and 4. The diameter of this inclined face is proportioned in relation to the complimentarily inclined face formed by the ridge 10b on the casing so that as the ring tool T is pushed axially towards the casing 10, guided by the fixture F, the flexible ring-shaped end 10a of the casing can be expanded radially in all directions. As indicated in FIGURE 4, since the plastic casing 10 is sufficiently soft, flexible and resilient to permit the action, the entire rim of 10a is expanded to a point where the crystal 12 can drop onto the seat 10c of the casing. When the tool T is retracted the annular rim 10a of the casing returns to its original position, so that the rib 10b forcibly engages the peripheral edge of the crystal 12. Thus, the casing and crystal are brought into contact along a circular path diagrammatically illustrated at P in FIGURE 5.

The resilience of the plastic material of the casing is sufficient to cause a very firm contact along the annular path P of engagement with the crystal, even to the extent of causing the sharp edge of the crystal to be slightly embedded in the material of the casing.

The cooperation between the case and the crystal is such as to force or cam the crystal tightly on the seat formed by the shoulder 10c.

Other advantages of this arrangement, in addition to producing a complete closure consisting of only two parts, include allowance within reasonable limits for various variations in the diameters and thicknesses of the crystals. In other words, by this simple arrangement practical allowance is made for normal dimensional variation in the parts being assembled. Furthermore, the crystal has a stiffening effect upon the adjacent region of the casing, because of the fact that these parts are tightly engaged. This is emphasized by the fact that when the crystal is not in place the rim 10a of the casing is quite flexible, but when the crystal is in place it becomes relatively rigid. Another advantage is that unauthorized tampering with the gauge is discouraged by the difficulty of gaining access to the interior of the casing without a special tool to release the crystal. Since the two parts of the assembly are waterproof, a weatherproof assembly is obtained without the use of gaskets or sealants. The projecting rim 10a also protects the crystal 12 from scratches.

From the above description, which is given in an illustrative sense, it will be apparent to those skilled in the art, that the details of this invention are capable of variation without departure from the novel subject matter herein disclosed. By way of example, it is clear that it is not necessary that the casing be circular in cross section, as other shapes can be used, as, for example, a square casing. Furthermore, a wide range of stretchable materials can be used to form the casing. It is intended, therefore, that the scope of this invention be determined by the appended claims, rather than by the single embodiment of the invention selected to illustrate it.

What is claimed:

1. A gauge instrument comprising in combination a condition responsive element, a housing integrally formed of a generally shock-resistant plastic enclosing said condition responsive element in generally exposed relation thereto to protect said condition responsive element against external shock, said housing having a firmly resilient tubular wall closed at its rear and open at its front, said wall at its front end having an annular extending groove opening inwardly of the wall and a crystal resiliently locked in said groove by its peripheral edge which lies in and is contacted by the resilient surface of said groove.

2. In the combination of claim 1, the surface portion of said groove behind said crystal with another surface portion of said groove elsewhere against said crystal forming a sealed joint thereat.

3. In the combination of claim 1 in which said peripheral crystal edge corners with the intersecting crystal surface thereat and the surface of said groove in front of said crystal is inclined so that the adjacent peripheral corner edge of said crystal is in contact therewith.

4. In the combination of claim 1 in which said peripheral crystal edge corners with the intersecting crystal surface thereat and the surface of said groove in front of said crystal is inclined so that the adjacent peripheral corner edge of said crystal is in contact therewith and the surface of said groove behind said crystal forming a sealed joint with the said front surface of said groove.

5. In the combination of claim 1 in which said peripheral crystal edge corners with the intersecting crystal surface thereat and the surface of said groove in front of said crystal is inclined so that the adjacent annular corner edge of said crystal is embedded therein.

6. A gauge instrument comprising in combination a condition responsive element, a housing integrally formed of a generally shock-resistant plastic enclosing said condition responsive element in generally exposed relation thereto to protect said condition responsive element against external shock, said housing having a resilient cup-shaped integral casing with an inwardly facing channel and a crystal having its peripheral edge resiliently enclosed by said channel against said crystal.

7. In the combination of claim 6 in which said channel is shaped on one side to have cooperative camming action with the peripheral edge of said crystal to forcibly seat it on the opposite side of the channel.

References Cited

UNITED STATES PATENTS

| 2,773,388 | 12/1956 | Prosser | 73—431 |
| 2,294,175 | 8/1942 | Graesser et al. | 73—431 |
| 2,426,800 | 9/1947 | Triplett | 73—431 X |
| 3,187,582 | 8/1965 | Perkins et al. | 73—431 |

FOREIGN PATENTS

| 889,185 | 2/1962 | Great Britain. |

DAVID SCHONBERG, *Primary Examiner.*

LOUIS R. PRINCE, *Examiner.*

D. M. YASICH, *Assistant Examiner.*